US012698377B2

(12) United States Patent
Yan et al.

(10) Patent No.: US 12,698,377 B2
(45) Date of Patent: Aug. 4, 2026

(54) VOC-FREE COUPLING AGENTS FOR RUBBER COMPOSITIONS

(71) Applicant: The Goodyear Tire & Rubber Company, Akron, OH (US)

(72) Inventors: Yuan-Yong Yan, Copley, OH (US); Gyusaang Youn, Copley, OH (US)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 588 days.

(21) Appl. No.: 18/317,237

(22) Filed: May 15, 2023

(65) Prior Publication Data

US 2024/0384066 A1 Nov. 21, 2024

(51) Int. Cl.

| | |
|---|---|
| ***C08K 5/372*** | (2006.01) |
| ***B60C 1/00*** | (2006.01) |
| ***C08F 36/06*** | (2006.01) |
| ***C08F 36/08*** | (2006.01) |
| ***C08K 3/04*** | (2006.01) |
| ***C08K 3/36*** | (2006.01) |

(52) U.S. Cl.

CPC ................ *C08K 5/372* (2013.01); *B60C 1/00* (2013.01); *C08F 36/06* (2013.01); *C08F 36/08* (2013.01); *C08K 3/04* (2013.01); *C08K 3/36* (2013.01)

(58) Field of Classification Search

CPC ...... C07C 321/28; C08K 5/372; C08K 5/375; C08K 5/3725

USPC ............................................ 568/25; 525/351

See application file for complete search history.

(56) References Cited

U.S. PATENT DOCUMENTS

| | | | | |
|---|---|---|---|---|
| 4,082,703 | A | 4/1978 | Duffy et al. | |
| 4,474,908 | A | 10/1984 | Wagner | |
| 5,587,416 | A | 12/1996 | Chevallier et al. | |
| 5,708,069 | A | 1/1998 | Burns et al. | |
| 5,780,535 | A | 7/1998 | Ohashi et al. | |
| 5,780,538 | A | 7/1998 | Cohen et al. | |
| 5,789,514 | A | 8/1998 | Burns et al. | |
| 5,800,608 | A | 9/1998 | Bomal et al. | |
| 5,827,912 | A | 10/1998 | Scholl | |
| 5,882,617 | A | 3/1999 | Chevallier et al. | |
| 6,005,027 | A | 12/1999 | Guillet et al. | |
| 6,075,096 | A * | 6/2000 | Wideman | C08K 5/3725 525/331.1 |
| 6,121,347 | A | 9/2000 | Yatsuyanagi et al. | |
| 6,136,913 | A | 10/2000 | Nahmias et al. | |
| 6,322,811 | B1 | 11/2001 | Verma et al. | |
| 6,573,324 | B1 | 6/2003 | Cohen et al. | |
| 6,608,145 | B1 | 8/2003 | Cruse et al. | |
| 6,627,686 | B1 * | 9/2003 | Sandstrom | C07C 323/37 524/236 |
| 7,550,610 | B1 | 6/2009 | Chang et al. | |
| 7,745,523 | B1 | 6/2010 | Woloszynek | |
| 8,003,724 | B2 | 8/2011 | Hahn et al. | |
| 8,288,474 | B2 | 10/2012 | Hergenrother et al. | |
| 8,440,750 | B2 | 5/2013 | Hahn et al. | |
| 9,074,073 | B2 | 7/2015 | Hahn et al. | |
| 9,359,215 | B2 | 6/2016 | Allain et al. | |
| 10,947,369 | B2 | 3/2021 | Hahn et al. | |
| 11,440,877 | B2 | 9/2022 | Kulig et al. | |
| 2002/0081247 | A1 | 6/2002 | Dodson | |
| 2005/0032965 | A1 | 2/2005 | Valero | |
| 2022/0195153 | A1 | 6/2022 | Papakonstantopoulos et al. | |
| 2022/0204351 | A1 | 6/2022 | Hahn et al. | |

FOREIGN PATENT DOCUMENTS

| | | | |
|---|---|---|---|
| EP | 0863179 | A1 | 9/1998 |

OTHER PUBLICATIONS

Debnath Subhas CH. et al: "Naturally Occurring Amino Acids: A Suitable Substitute of N-N/-Di-phenyl Guanidine (DPG) in Silica Tyre Formulation?", Kautschuk Gummi Kunststoffe (Zeitschrift Fuer Hochpolymere Werkstoffe), vol. 66, No. 1-2, Feb. 1, 2013 (Feb. 1, 2013), pp. 25-31.

EP Search Report for Application No. 24174767.4, dated Nov. 4, 2024.

Ten Brinke, et al., "The Influence of Silane Sulphur Rank on Processing of a Silica-reinforced Tyre Tread Compound," Kautsch. Gummi Kunstst 55, pp. 244-254, 2002.

Lee, et al., "Single-molecule mechanics of mussel adhesion," PNAS, 103(35), pp. 12999-13003, 2006.

Lee, et al., "Self-healing of cross-linked PU via dual-dynamic covalent bonds of a Schiff base from cystine and vanillin," Materials and Design, 172, 107774, 10 pages, 2019.

(Continued)

*Primary Examiner* — Fred M Teskin

(74) *Attorney, Agent, or Firm* — Mandy B. Willis

(57) ABSTRACT

A coupling agent, a rubber composition, and a shaped article formed from the rubber composition, such as a pneumatic tire, are described. The coupling agent is represented by Formula I, and is capable of linking a substrate, such as a mineral oxide, carbon black or brass, to an unsaturated elastomer:

Formula I $$FG1—LG1—S_a—LG2—FG2$$

where FG1 and FG2 each represent a functionalized arylene group, which can be the same or different; LG1 and LG2 each represent a linking group, which can be the same or different; and $S_a$ represents a sequence of two or more connected sulfur atoms, where a is a number which is at least 2.

15 Claims, No Drawings

(56) References Cited

OTHER PUBLICATIONS

Wang, et al., "Mussel-Inspired Surface Engineering for Water-Remediation Materials," Matter, 1, 115-155, 2019.
Wu, et al., "Designing novel epoxy-terminated polybutadiene to construct chemical interface between nanosilica and rubbers with green nature," Composites Part B, 178, 107451, 9 pages, 2019.

* cited by examiner

VOC-FREE COUPLING AGENTS FOR RUBBER COMPOSITIONS

FIELD

The exemplary embodiment relates to coupling agents for rubber compositions. It finds particular application in connection with a coupling agent suited to forming links between reinforcing fillers and unsaturated rubber polymers, to a rubber composition which includes the coupling agent or a reaction product thereof, to an article formed from the coupling agent, and a method of forming the article.

BACKGROUND

Rubber compositions for vehicle tires often contain blends of various elastomers. Unsaturated elastomers, such as polyisoprene (synthetic and natural rubber), styrene-butadiene rubber (SBR), and polybutadiene rubber, are commonly used for automobile tire treads. A filler material, such as silica and/or carbon black is often added, to improve properties of the tire, such as increasing the wear resistance, reducing the rolling resistance, and improving the wet grip. The physical properties of the cured rubber composition depend, in part, upon the degree to which the fillers are homogeneously dispersed throughout the rubber. This is related to the affinity of the carbon black or silica to the rubber.

To improve interaction between the filler and rubber and aid dispersion, a bifunctional silane coupling agent is often employed. These organosilane coupling agents serve dual functions. One is to make the silica surface more hydrophobic, which is achieved by the reaction of hydrolysable groups, such as alkoxy groups, of the silane coupling agent with the silanol groups on the silica surface. Another function of the silane coupling agent is to link silica particles to the elastomers and thus improve reinforcement. The coupling agents, such as bis(3-triethoxysilylpropyl)-disulfide (TESPD) and bis(3-triethoxysilylpropyl)-tetrasulfide (TESPT), release ethanol on reaction of the compound with silica. The ethanol produced is also considered undesirable for the environment. Thus, VOC-free coupling agents are highly desired for rubber compounding.

Recently, attempts have been made to reduce the production of VOCs in coupling reactions. For example, U.S. Pat. No. 8,288,474 B2 to Hergenrother, et al., describes the use of alkoxy-modified silsesquioxane compounds that contain an alkoxysilane group that participates in an alkoxysilane-silica reaction as a silica dispersing agent in rubber. However, such compounds can result in less desirable properties of the cured rubber, e.g., in terms of the modulus.

Another approach is described in Wu, et al., "Designing novel epoxy-terminated polybutadiene to construct a chemical interface between nanosilica and rubbers with green nature," Composites Part B, 178, 107451, pp. 1-9, 2019. In Wu, et al., epoxy-terminated polybutadiene (ETPB), synthesized by anionic polymerization, is used to form a chemical interface between silica and diene rubber, without emission of volatile organic compounds. However, the method requires preparation of a polybutadiene with a narrow polydispersity and also results in the production of chlorolithium during the formation of the ETBD.

There remains a need for a coupling agent which is capable of forming links between an unsaturated rubber and another material, such as a particulate filler or a metal, which may also reduce the emission of VOCs.

BRIEF DESCRIPTION

In accordance with one aspect of the exemplary embodiment, a coupling agent, which is capable of linking a mineral oxide, carbon black, and/or brass to an unsaturated elastomer, is represented by Formula I:

Formula I $$FG1—LG1—S_a—LG2—FG2,$$

where FG1 and FG2 each represent a functionalized arylene group, such as a phenylene or naphthalene-based aryl group, which can be the same or different; LG1 and LG2 each represent a linking group, which can be the same or different; and $S_a$ represents a sequence of two or more connected sulfur atoms, where a is a number which is at least 2.

In the coupling agent, at least one of the functionalized arylene groups FG1 and FG2 may include at least one reactive substituent selected from hydroxyl groups (—OH), primary and secondary amino groups (—$NH_2$, —NHR), sulfhydryl groups (—SH), boronic acid groups [—$B(OH)_2$], and mixtures thereof.

At least one of the functionalized arylene groups FG1 and FG2 may have the general form shown in Formula II:

Formula II

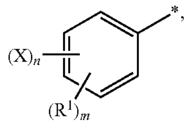

where each X is independently selected from the group of reactive substituents —OH, —$NH_2$, —NHR, —$B(OH)_2$, and —SH; n is at least 1, or up to 5, or up to 3; each $R^1$ is independently a hydrocarbyl group or where two $R^1$ groups together form a ring; m is 0, or at least 1, or up to 4; and * represents a connection to a respective one of the linking groups LG1 and LG2.

In one embodiment, each X is OH.

In one embodiment, each n is 1 or 2.

In one embodiment, each m is 0.

In one embodiment, each LG1 is of the general form:

$$—CH{=}N—(CH(COOH))_q—(CR^2R^3)_p—CH_2—,$$

where each p is 0 or at least 1, or at least 2, and/or up to 10, or up to 5; each q is 0 or at least 1; $p+q \geq 1$; and each of $R^2$ and $R^3$ is independently H, a hydrocarbyl group, or an oxygen-containing group. LG2 can be the inverse of LG1.

In one embodiment, LG1 is of the general form: —CH=N—$CH_2$—$CH_2$—, and LG2 is its inverse. In another embodiment, LG1 is —CH=N—CH(COOH)—($CH_2$)—, and LG2 is its inverse.

In one embodiment, the coupling agent has a structure as shown in any of Formulae E, F, G, H, I, J, K, L, M, N, and O:

Formula E

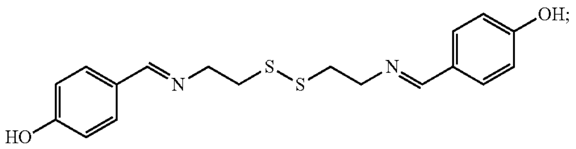

Formula F

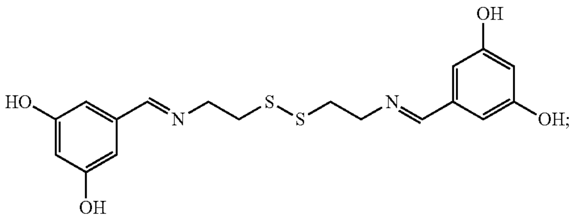

Formula G

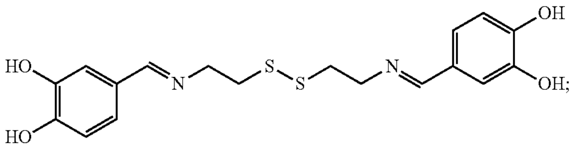

Formula H

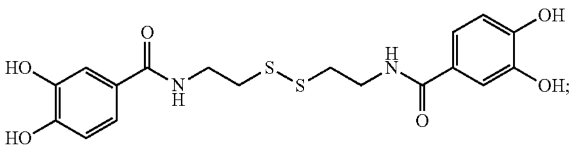

Formula I

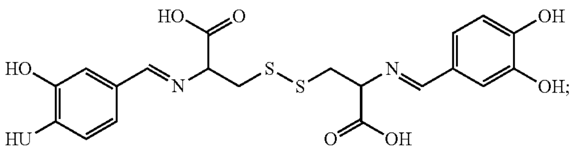

Formula J

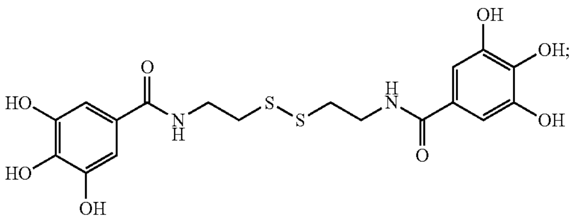

Formula K

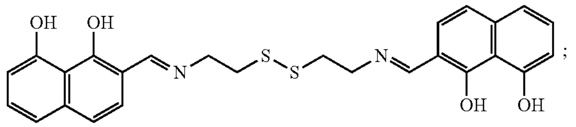

-continued

Formula L

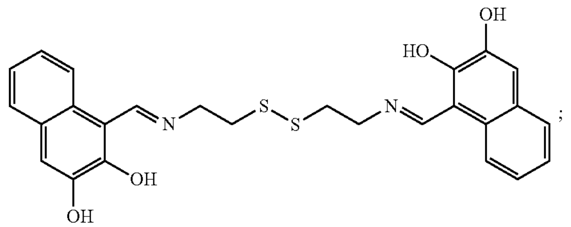

Formula M

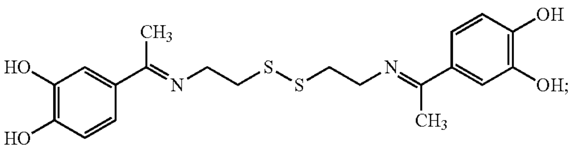

Formula N

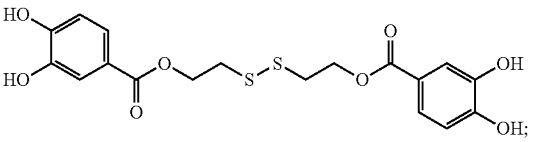

and

Formula O

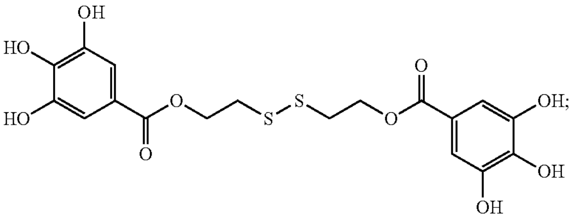

and/or their amino, sulfhydryl, and boronic acid equivalents, formed by replacing one or more of the —OH groups with $—NH_2$, —NHR, $—B(OH)_2$, and/or —SH; and mixtures thereof.

In another embodiment, a mixture or a reaction product of the coupling agent, as described in any of the embodiments herein, and silica is provided.

In another embodiment, a rubber composition includes, or is the reaction product of, an unsaturated elastomer; the coupling agent as described in any of the embodiments herein; at least one filler selected from a mineral oxide filler and carbon black; and a sulfur-based curing agent.

In the rubber composition, the mineral oxide filler may include silica.

An article may be formed from the rubber composition described herein. The article may include a pneumatic tire or a portion thereof.

In accordance with another aspect of the exemplary embodiment, a coupling agent is formed by the reaction of a difunctional organic polysulfide having a first reactive group at a first end and a second reactive group at a second end; and a polyfunctional arylene compound which has a first functional group that is capable of reaction with the reactive groups of the difunctional organic polysulfide and a second functional group that is capable of interaction with a substrate surface, the polyfunctional arylene compound being in sufficient amount to react with the first and second reactive groups of the difunctional organic polysulfide.

In the coupling agent, the difunctional organic polysulfide may be selected from L-cystine, cystamine, and 2-hydroxyethyl disulfide. In the coupling agent, the first functional group may be selected from an aldehyde group, a carboxylic acid group, an ether group, and an ester group.

In the coupling agent, the second functional group may be selected from the group consisting of a hydroxyl group, an amino group, a thiol group, and combinations thereof.

In forming the coupling agent, the polyfunctional arylene compound may have the general formula:

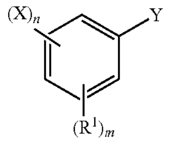

where Y represents the first functional group; X represents the second functional group; n is at least 1; each $R^1$ is independently a hydrocarbyl group or where two $R^1$ groups together form a ring, such as a 5 or 6 membered aryl group which is optionally substituted; and m is 0, or at least 1.

In accordance with another aspect of the exemplary embodiment, a method of forming a tire includes combining the coupling agent described herein with an unsaturated elastomer, at least one filler selected from a mineral oxide filler and carbon black, and a sulfur-based curing agent to form a mixture; shaping the mixture to form a green component of a tire; and curing the green component with other green components to form the tire.

DETAILED DESCRIPTION

Aspects of the exemplary embodiment relate to coupling agents which are suited to use in rubber compositions, such as those formed by compounding a filler material, such as silica and/or carbon black, with an uncured unsaturated elastomer.

The coupling agents find use in preparation of a component for a pneumatic tire, such as a tire tread (which defines the road contacting surface of the tire), a tire innerliner (which provides an oxygen and moisture resistant layer radially inward of the tread), and tire plies (metal wire reinforced rubber strips, which provide added strength to the tires). The coupling agents may also find use in medical articles and articles for home and industrial use, such as rubber gloves, storage containers, hoses, and the like.

The exemplary coupling agents can be considered to be VOC-free, in that the linking of the coupling agent with the filler material and rubber can be performed without release of volatile organic compounds, such as ethanol and/or butadiene, which are considered to be detrimental to the environment.

The coupling agents are also advantageous in that they not only form links between elastomers and mineral oxides, such as silica particles, but also can form links between unsaturated elastomers and carbon black, and also with brass cords, which are used as reinforcements in rubber plies. The coupling agents thus find application in a range of rubber compositions.

In the description of this invention, the term "phr" refers to parts of a respective material per 100 parts by weight of rubber, or elastomer. By convention, the uncured rubber employed in the rubber composition totals 100 phr. The claimed composition may thus comprise other polymers than explicitly mentioned in the claims, provided that the phr value of the rubber totals 100.

The term "phf" refers to parts per hundred filler, by weight.

The terms "rubber" and "elastomer" may be used interchangeably unless otherwise indicated. The terms "cure" and "vulcanize" may be used interchangeably unless otherwise indicated.

The Coupling Agent

The coupling agent described herein is a mono- or poly-functionalized diarylene polysulfide, which may have the general form shown in Formula I:

Formula I $$FG1—LG1—S_a—LG2—FG2$$

where FG1 and FG2 each represent an arylene group, which can be the same or different;

LG1 and LG2 each represent a linking group, which can be the same or different (illustrated by  in some of the following formulae); and $S_a$ represents a sequence of two or more connected sulfur atoms, where a is a number which is at least 2 and may be up to 10, or up to 5, or up to 4.

An arylene group, as used herein, refers to an aryl substituent that is derived from an aromatic ring, usually an aromatic hydrocarbon, such as phenyl or naphthyl. In the exemplary coupling agent, each arylene group is functionalized with at least one reactive substituent that replaces one of the hydrogens on the aromatic ring. The exemplary reactive substituent is capable of forming links with at least one of a mineral oxide substrate, such as silica particles, a carbon reinforcing material, such as carbon black, and a metal substrate, such as brass. The reactive substituent(s) may be selected from hydroxyl groups (—OH), primary and secondary amino groups (—$NH_2$, —NHR), thio groups (—SH), boronic acid [—$B(OH)_2$], and mixtures thereof.

The links formed can be strong, e.g., covalent bonds in the case of silica, or weaker links, which aid in adhesion of the elastomer to the respective substrate.

At least one, or both, of the arylene groups FG1 and FG2 may have the general form shown in Formula II:

Formula II

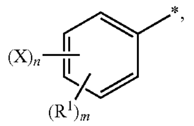

where each X is independently selected from reactive substituents, such as —OH, —$NH_2$, —NHR, —$B(OH)_2$, and —SH;

n is at least 1 and may be up to 5, or up to 3, e.g., n is 1, 2, or 3, thus providing a mono-, di-, or tri-functional aryl group;

each $R^1$ is independently a hydrocarbyl group or where two $R^1$ groups together form a ring, such as a 5 or 6 membered aryl group which is optionally substituted;

m is 0, or at least 1, or up to 4, such as 1, 2, or 3; and

* represents the connection to the respective linking group.

As will be appreciated, for each arylene group FG1 and FG2, $n+m \leq 5$ generally applies, except in the case of fused rings, such as naphthalene rings, where reactive substituents may be present on two or more of the fused rings.

In one embodiment, each X is OH.

In one embodiment, n is 1 or 2.

In one embodiment, m is 0.

The term "hydrocarbyl group" e.g., with reference to $R^1$, refers to a group having a carbon atom directly attached to the remainder of the molecule and having predominantly hydrocarbon character. By predominantly hydrocarbon character, it is meant that at least 60%, or at least 70%, or at least 80% of the atoms in the group are selected from hydrogen and carbon. Heteroatoms which may be incorporated in a hydrocarbyl group include sulfur, oxygen, nitrogen, and halogens, and encompass substituents, such as sulfoxide, pyridyl, furyl, thienyl and imidazolyl. In general, no more than two, and in one embodiment, no more than one, non-hydrocarbon substituent will be present in the hydrocarbyl group. In some embodiments, there are no non-hydrocarbon substituents in the hydrocarbyl group. Each of the $R^1$ groups that are hydrocarbyl groups may include from 1-30 carbon atoms.

Examples of hydrocarbyl groups useful as the $R^1$ groups include aliphatic (e.g., alkyl or alkenyl) groups, alicyclic (e.g., cycloalkyl, cycloalkenyl) groups, aryl groups, and aryl-, aliphatic-, and alicyclic-substituted aryl groups, as well as cyclic groups wherein the ring is completed through another portion of the molecule (e.g., two substituents together form a ring); hetero-substituted hydrocarbon groups, that is, groups containing non-hydrocarbon groups (e.g., halo (especially chloro and fluoro), hydroxy, alkoxy, mercapto, alkylmercapto, nitro, nitroso, and sulfoxy), such as heteroaliphatic, heteroalicyclic, heteroaryl, and heteroaryl-, heteroaliphatic-, and heteroalicyclic-substituted aryl groups.

Examples of alkyl and alkenyl groups suitable as $R^1$ include C1 to C30, or C1-C10, or C1-C8, or C1-C6 alkyl groups, such as methyl, ethyl, n-propyl, isopropyl, n-butyl, isobutyl, sec-butyl, n-pentyl, isopentyl, neopentyl, n-hexyl, and the like, and C2-C30 alkenyl equivalents thereof. Representative cycloalkyl groups include cyclic versions of alkyl groups that are not aromatic and include monocyclic, bicyclic, and multicyclic cycloalkyl ring systems. Cycloalkyl groups may contain from 3 to 30 carbon atoms. Examples of cycloalkyl groups include cyclopropyl, cyclobutyl, cyclopentyl, cyclohexyl, 1-cyclohexenyl, 3-cyclohexenyl, cycloheptyl, and the like.

Specific examples of FG1 and FG2 include:

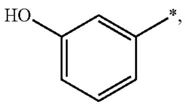, 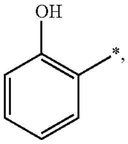, 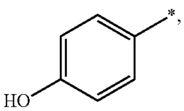, 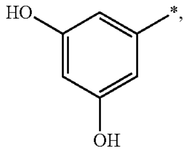, 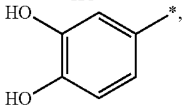, 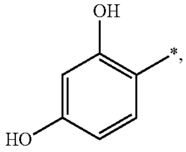, 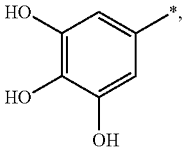, -continued

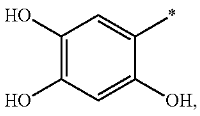

amino and sulfhydryl equivalents thereof, such as

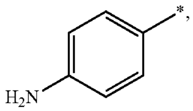, 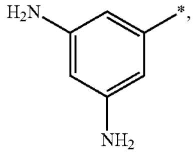, 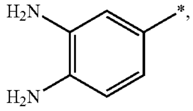, 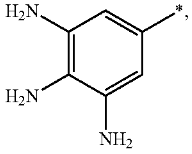, 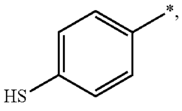, 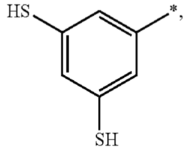, and

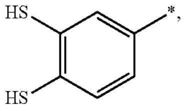, compounds containing mixtures of functional groups X, such as:

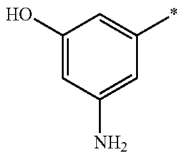 and 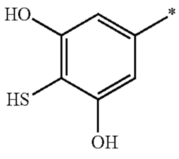 , compounds including at least one $R^1$ group, such as

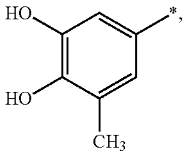, and 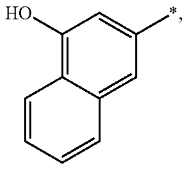, and combinations thereof.

Formula III illustrates an exemplary coupling agent where a is 2. It is to be appreciated that longer sulfur bridges are also contemplated.

Formula III

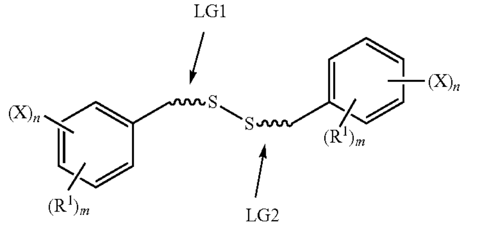

where each X is independently selected from —OH, —$NH_2$, —NHR, [—$B(OH)_2$], and —SH, and is not an alkoxy group;

each n is independently at least 1 and may be up to 5, or up to 3, such as 1, 2, or 3, thus providing mono-, di-, or tri-functional aryl groups;

in the case of —NHR, each R is a hydrocarbyl group;

each $R^1$ is independently a hydrocarbyl group, as defined above, or where two $R^1$ groups on the same arylene group FG1 or FG2 together form a ring, such as a 5 or 6 membered aryl group which is optionally substituted;

each m is independently 0, or at least 1, such as 1, 2, or 3.

In one embodiment, the coupling agent has the general form shown in Formula IV:

Formula IV

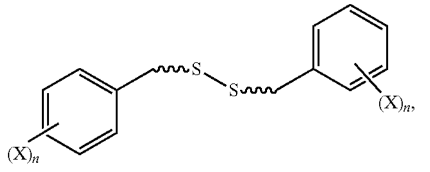

where n and X are as described above.

Illustrative examples of coupling agents in accordance with Formulae III and IV include Formulae A, B, C, and D:

Formula A

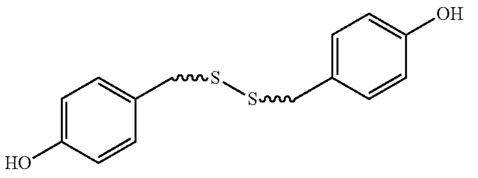

Formula B

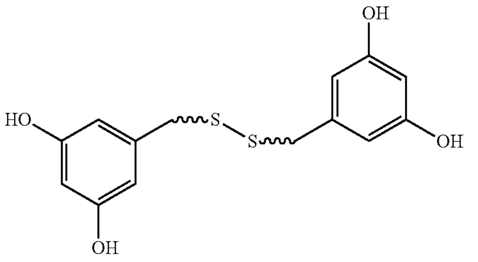

-continued

Formula C

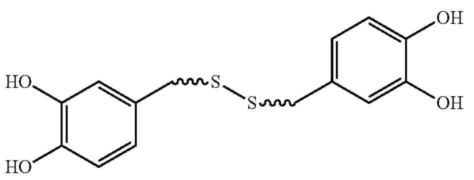

Formula D

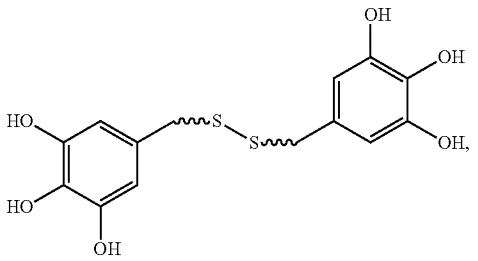

and their amino, boronic acid, and thiol equivalents.

The linking group, LG1 links FG1 to the respective adjacent first sulfur atom of the sulfur bridge and LG2 links FG2 to the respective adjacent last sulfur atom of the sulfur bridge. The linking groups can each include a chain of at least three atoms, or at least four atoms, e.g., up to 10 atoms, and may be saturated or unsaturated. The chain may include carbon atoms and optionally one or more nitrogen atoms. One or more of the atoms in the chain may be substituted, e.g., with an oxygen-containing group. The atom next to the sulfur bridge may be an unsubstituted carbon atom (i.e., a methylene group). This favors breaking of the coupling agent at the sulfur bridge in some reaction mechanisms to form bonds with the unsaturated elastomers during cure. Other cure mechanisms make use of thio-ene reaction, where a double bond near the sulfur bridge is advantageous.

Example linking groups LG1, LG2 include nitrogen-containing groups, of the general form:

—CH═N—$(CH(COOH))_q$—$(CR^2R^3)_p$—$CH_2$—, in the case of LG1, and the inverse, —$CH_2$—$(CR^2R^3)_p$—$(CH(COOH))_q$—N═CH—, in the case of LG2.

where each p is 0, or at least 1, or at least 2, and may be up to 10, or up to 5;

each q is 0, or at least 1;

$p+q\geq 1$; and each $R^2$ and $R^3$ is independently H, a hydrocarbyl group, as described above for $R^1$, or an oxygen-containing group.

In one embodiment, each p is 1, each q is 0, each $R^2$ is H, and each $R^3$ is H. Specifically, LG1 is —CH═N—$CH_2$—$CH_2$—, and LG2 is its inverse.

In another embodiment, each p is 1, each q is 1, each $R^2$ is H, and each $R^3$ is H. Specifically, LG1 is —CH═N—CH(COOH)—$(CH_2)$—, and LG2 is its inverse.

Other example linking groups LG1, LG2 include nitrogen-containing groups, of the general form:

—C(═O)—NH—$(CR^2R^3)_s$—$CH_2$—, in the case of LG1, and the inverse,

—$CH_2$—$(CR^2R^3)_s$—NH—C(═O)—, in the case of LG2; and where each s is 0, or at least 1, or at least 2, and may be up to 10, or up to 5; and $R^2$ and $R^3$ are as described above.

In one embodiment, each s is 1, each $R^2$ is H, and each $R^3$ is H. Specifically, LG1 is —C(═O)—NH—$CH_2$—$CH_2$—, and LG2 is its inverse.

Illustrative, but non-limiting, coupling agents are shown in Formulae E to O:

Formula E

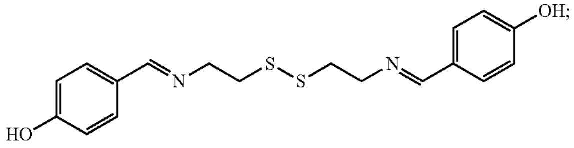

Formula F

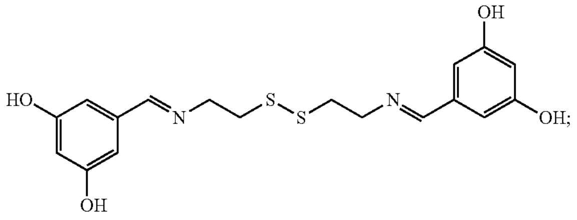

Formula G

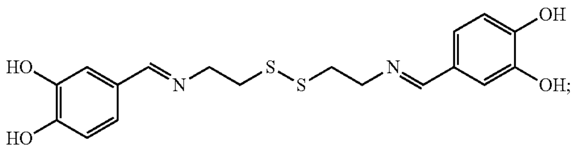

Formula H

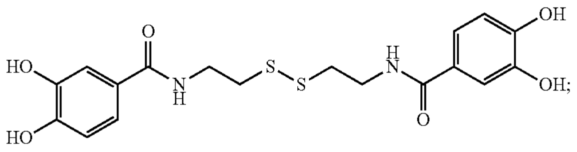

Formula I

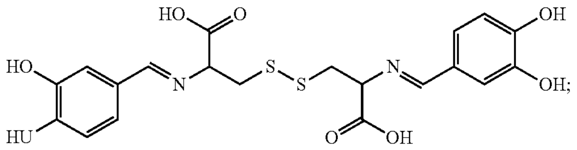

Formula J

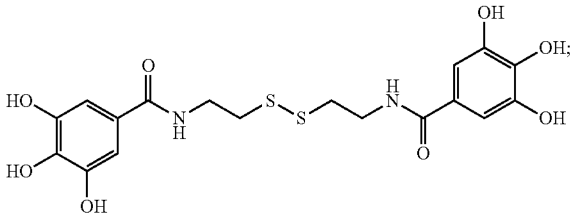

Formula K

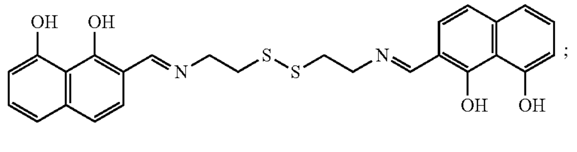

-continued

Formula L

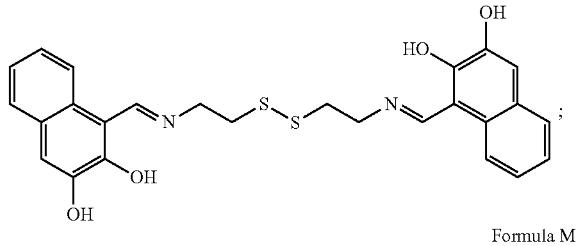

Formula M

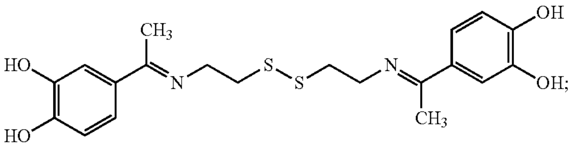

Formula N

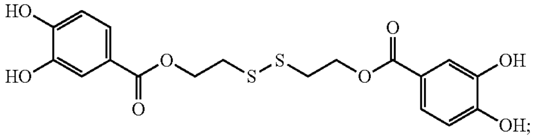

and

Formula O

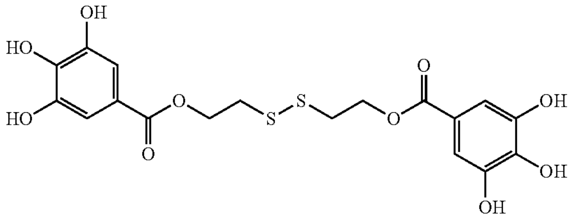

and their amine, boronic acid, and sulfhydryl equivalents formed by replacing one or more of the OH groups with an amine, boronic acid, or sulfhydryl group, as illustrated, for example, in Formula P:

Formula P

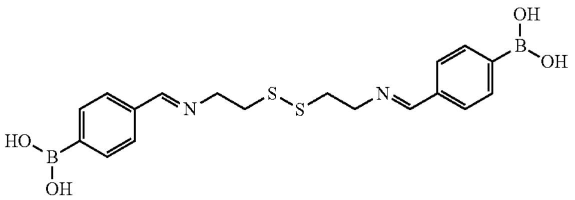

The exemplary coupling agents are silane-free coupling agents, in particular, they do not contain any Si—H or Si—O links, and may be free of silicon atoms. Thus, rather than forming covalent links to a substrate through a silane group, the exemplary coupling agents are able to form coordinate or hydrogen bonds with a variety of substrates, including silica and other mineral fillers, as well as carbon black, and metals, such as brass.

Preparation of the Coupling Agent

The exemplary coupling agents of the type illustrated above may be formed by reaction of 1) an amine-terminated organic polysulfide (e.g., a disulfide, or trisulfide, etc.), with 2) a polyfunctional arylene compound. The organic polysulfide may have a weight average molecular weight Mw of at least 225, such as up to 500. Examples of organic polysulfides include cystamine, L-cystine, and 2-hydroxyethyl disulfide.

In one embodiment, the amine-terminated organic polysulfide, e.g., cystamine, is prepared by reaction of cystamine dihydrochloride, or other halo-terminated disulfide, with a trialkyl amine, such as triethyl amine. The reaction can be carried out in water/ethanol. Hydrochloric acid, formed in the reaction, can be neutralized by addition of an equimolar amount of a base, such as potassium hydroxide.

The arylene compound includes a first functional group, which is capable of reacting with the terminal amine groups of the amine-terminated organic polysulfide, and a second functional group (or groups) that serves as X in formulae II and III, i.e., which is/are capable of forming a covalent bond with silica or other interaction with a substrate. Examples of the first functional group include aldehyde, carboxylic acid, and ester groups. Examples of the second functional group include hydroxyl, amino, sulfhydryl, and multiples and combinations thereof. Example polyfunctional arylene compounds include mono-, di- and tri-hydroxybenzaldehyde, mono-, di-, and tri-hydroxybenzoic acid, and alkyl esters thereof.

As an example, the polyfunctional arylene compound has a first functional group Y that is capable of reaction with the amine-terminated organic polysulfide and a second functional group X, that is capable of reaction with, for example, a silica particle. The polyfunctional arylene compound may have the general formula:

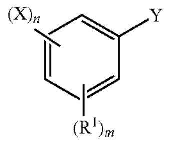

where Y represents the first functional group, e.g., an aldehyde, carboxylic acid, or ester group; and where X, $R^1$, n, and m are as previously defined.

The polyfunctional arylene compound can be dissolved in a suitable solvent, such as ethanol and/or water, and added to the cystamine-containing solution. The reaction of the cystamine with the polyfunctional arylene compound can be observed by a color change. In some cases, e.g., when a substituted aryl carboxylic acid, such as a hydroxybenzoic acid, is employed as the polyfunctional arylene compound, a catalyst and/or a coupling agent may also be used. A suitable reaction temperature is about room temperature, generally from 15-30° C., although higher or lower temperatures may be used. The reaction may take several hours, under reflux, to reach completion. The precipitate of a Schiff base that is formed can be filtered and washed with water and ethanol, then dried, e.g., by vacuum drying at 80° C. for 8 hours to form a solid product.

Reaction Scheme 1 illustrates the reaction of cystamine with 4-hydroxybenzaldehyde.

Reaction Scheme 1

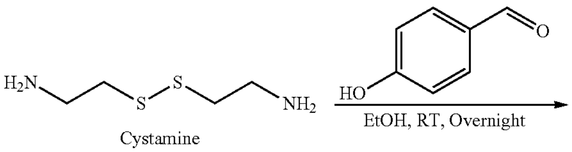

-continued

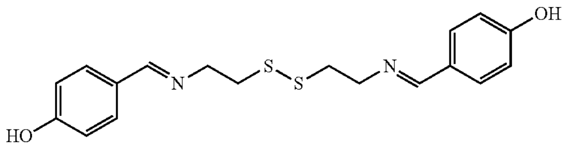

Formula E

In order to provide sufficient 4-hydroxybenzaldehyde to react with both amine groups on the cystamine, a molar ratio of 4-hydroxybenzaldehyde to cystamine may be about 2:1.

Reaction Scheme 2 illustrates the reaction of cystamine with 3,5-dihydroxybenzaldehyde.

Reaction Scheme 2

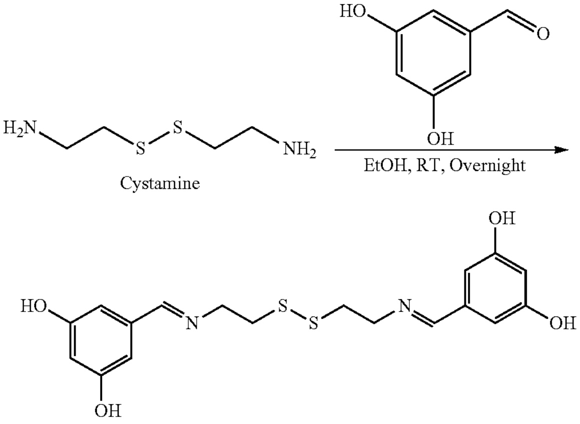

Formula F

Reaction Scheme 3 illustrates the reaction of cystamine with 3,4-dihydroxybenzaldehyde.

Reaction Scheme 3

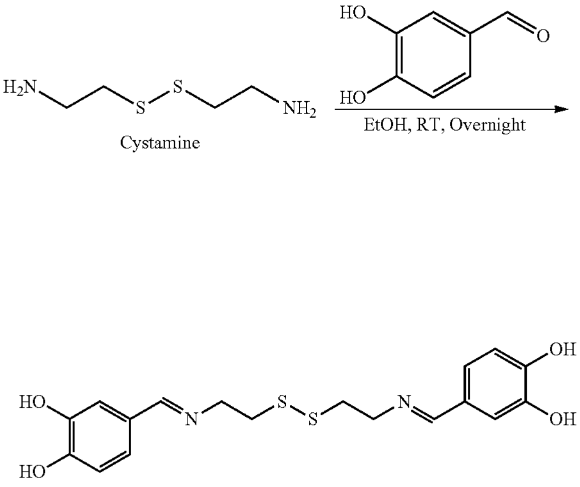

Formula G

Reaction Scheme 4 illustrates the reaction of cystamine with 3,4-dihydroxybenzoic acid.

Reaction Scheme 4

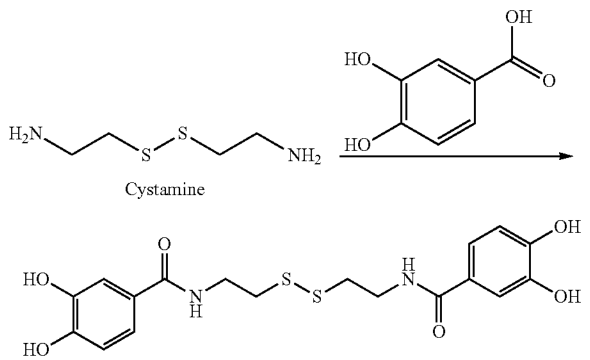

Cystamine

Formula H

Reaction Scheme 5 illustrates the reaction of cystamine with 3,4,5-trihydroxybenzoic acid. In this example, an amide coupling agent, such as N,N'-dicyclohexylcarbodiimide (DCC), and/or an organocatalyst, such as 4-dimethylaminopyridine (DMAP) may also be used.

Reaction Scheme 5

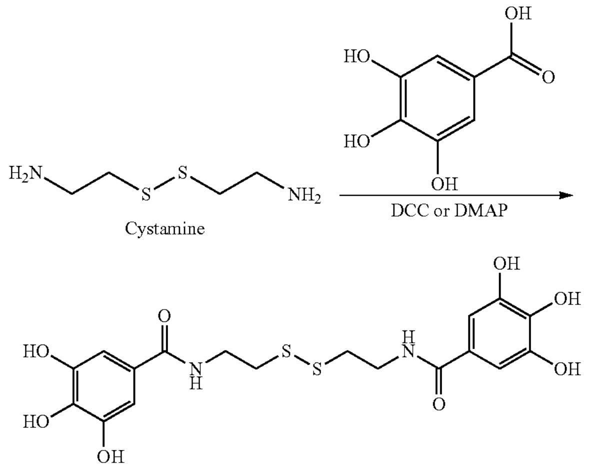

Cystamine

Formula J

In the case of L-cystine, the reaction may take place in a basic aqueous solution (e.g., by addition of KOH in water), but can be otherwise performed as for cystamine. Reaction Scheme 6 illustrates the reaction of L-cystine with 2,3-dihydroxybenzaldehyde to form a Schiff base.

Reaction Scheme 6

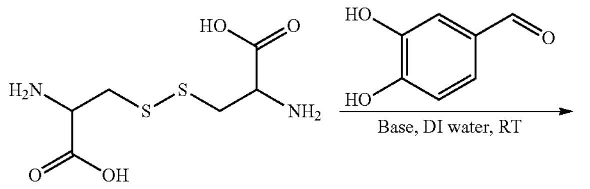

L-Cystine

-continued

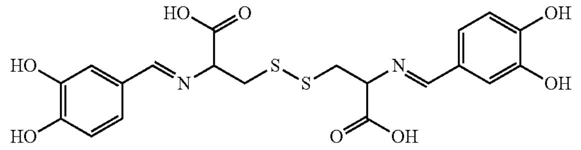

Formula I

As will be appreciated, in practice, less than 100% conversion may occur in these reaction schemes and the desired product may be separated from the reaction mixture by filtering, solvent washing, and/or other separation methods.

Reaction of the Coupling Agent with a Substrate and an Elastomer

The effect of contacting a surface of a substrate (such as a mineral oxide filler, carbon black, or metal surface, such as brass) with the coupling agent can result in one or more types of interaction, such as chemical bonding, altering the wetting or adhesion characteristics of the substrate surface, utilizing the inorganic oxide to catalyze chemical transformations at the heterogeneous interface, ordering the interfacial region, and/or modifying its partition characteristics. In the case of silica or silicates, it includes the ability to generate a covalent bond between the coupling agent and the silica surface. Stable condensation products are also formed with other oxides, such as those of aluminum, zirconium, tin, titanium, and nickel. Less stable bonds may be formed with oxides of boron, iron, and carbon.

An example reaction scheme in the case where the functional groups on the arylene groups of the coupling agent are both hydroxyl is shown in Reaction Scheme 7.

Reaction Scheme 7

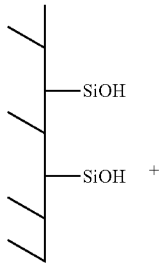

Substrate Surface

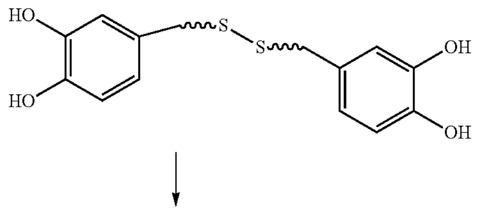

-continued

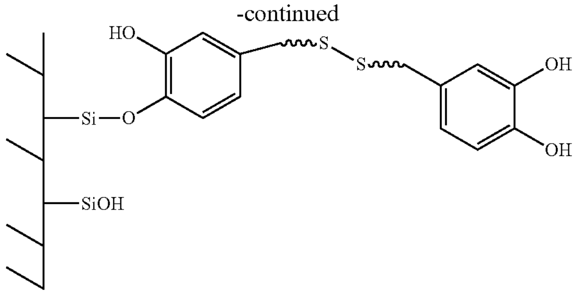

In the illustrated reaction, one of the hydroxyl groups on the adjacent arylene group forms a covalent bond with a silanol group on the surface of the silica particle with concomitant loss of water. While it is possible for additional hydroxyl groups on the coupling agent molecule to interact with the same or other silica particles, this is much less favored.

The sulfur bridge of the coupling agent reacts with the unsaturated elastomer, coupling the silica particle to the elastomer through cure chemistry or thiol-ene reaction with unsaturated backbone in the elastomer:

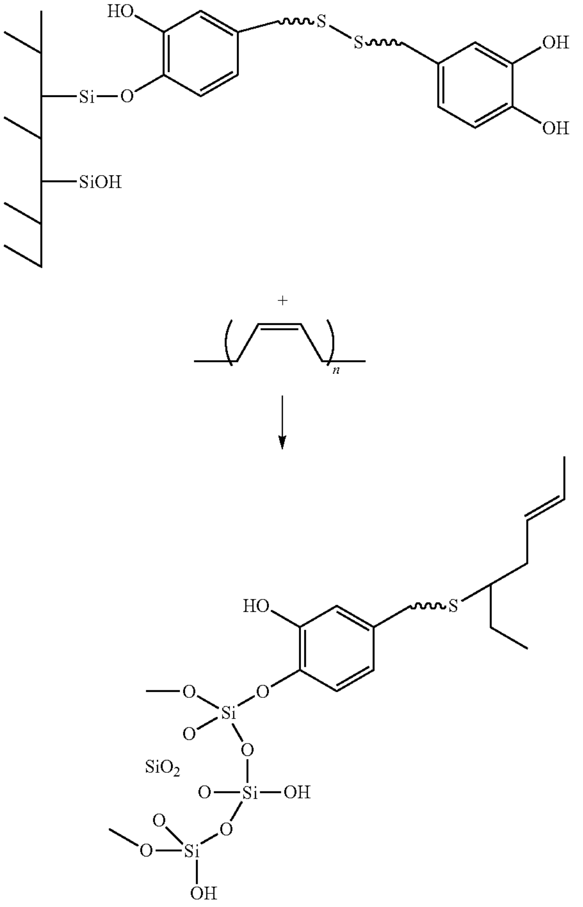

It is to be appreciated that the unsaturated elastomer may additionally or alternatively incorporate monomer units other than the butadiene unit illustrated and/or that coupling agent may be coupled to fewer than all the unsaturated groups in the elastomer. Examples of the other monomer units which may be incorporated in the unsaturated elastomer in addition to, or as an alternative to butadiene, include those derived from isoprene, dimethyl butadiene, styrene, methyl styrene, acrylate monomers, methacrylate monomer, and the like.

Although described sequentially, the reactions between the coupling agent and the substrate and between the coupling agent the elastomer can occur substantially simultaneously or in reverse order. The reaction with the substrate tends to occur at lower temperatures than the reaction with the elastomer and thus may tend to occur first when both the substrate and elastomer are present during progressively raising the temperature for cure. In one embodiment, a portion of the coupling agent may be added to the mineral oxide filler to form a surface layer on the filler and thus improve subsequent dispersion in the diene elastomer, with the remainder added to the rubber composition during the non-productive or productive phase.

As will be appreciated, the reaction scheme is intended to be illustrative only and that other reactions may occur to link the coupling agent to the substrate and/or to the diene rubber.

The coupling reactions proceed without elimination of VOCs, such as ethanol and butadiene, which are common biproducts when conventional silane coupling agents are used.

The exemplary coupling agent is also able to form links between diene polymers and carbon black. These links may be weak links, but still provide benefits to the resulting rubber composition. The exemplary coupling agent is also able to form links between diene polymers and metal surfaces, such as brass. This is advantageous in wire-reinforced components, such as plies. These are strips of rubber encapsulating wires formed of brass or other metals, which are positioned inward of the tire tread.

The reaction of the coupling agent with the silica particles (or other substrate) and elastomer may take place at elevated temperatures (e.g., 50° C.-170° C., such as 150° C.-160° C.). In some embodiments, a catalyst may be employed. The formation of covalent bonds between the coupling agent and the substrate surface may proceed with a certain amount of reversibility.

Rubber Composition

The coupling agent may be used in a rubber composition containing one or more elastomers. The term "rubber composition," refers to a mixture of rubber (elastomer), and generally one or more additional additives, such as reinforcing fillers, processing aids, a sulfur-based curing agent, vulcanization accelerators and activators, antioxidants, and the like, in which the exemplary coupling agent is also used. The elastomer includes a diene-based elastomer, in particular a conjugated diene elastomer. Illustrative examples of the components of the rubber composition are as follows:

The rubber composition may include at least 0.1 phr, or at least 0.5 phr or at least 1 phr, or up to 20 phr, or up to 10 phr, or up to 6 phr, or up to 3 phr, or up to 2 phr of the coupling agent. The coupling agent may be present in an amount sufficient to provide a ratio, by weight, of the total amount of coupling agent to silica filler of at least 0.1:100, or at least 1:100, or at least 2:100, or up to 25:100, or up to 20:100, or up to 8:100. When the silica is pretreated with the coupling agent, lower amounts of coupling agent may be used than when the silica is treated during compounding with the coupling agent.

The Elastomer(s)

The elastomer may include one or more of polyisoprene (natural rubber and/or synthetic polyisoprene), polybutadiene, a styrene-butadiene copolymer, such as solution-polymerized styrene-butadiene (SSBR) or emulsion-polymerized styrene-butadiene rubber (ESBR), butadiene rubber (BR), a halobutyl rubber, such as bromobutyl rubber or chlorobutyl rubber, nitrile rubber, liquid rubbers, polynorbornene copolymer, isoprene-isobutylene copolymer, ethylene-propylene-diene rubber, chloroprene rubber, acrylate rubber, fluorine rubber, silicone rubber, polysulfide rubber, epichlorohydrin rubber, styrene-isoprene-butadiene terpolymer, hydrated acrylonitrile butadiene rubber, isoprene-butadiene copolymer, butyl rubber, hydrogenated styrene-butadiene rubber, butadiene acrylonitrile rubber, a terpolymer formed from ethylene monomers, propylene monomers, and/or ethylene propylene diene monomer (EPDM), isoprene-based block copolymers, butadiene-based block copolymers, styrenic block copolymers, styrene-butadiene-styrene block copolymer (SBS), styrene-ethylene/butylene-styrene block copolymer (SEBS), styrene-[ethylene-(ethylene/propylene)]-styrene block copolymer (SEEPS), styrene-isoprene-styrene block copolymer (SIS), random styrenic copolymers, hydrogenated styrenic block copolymers, styrene butadiene copolymers, polyisobutylene, ethylene vinyl acetate (EVA) polymers, polyolefins, amorphous polyolefins, semi-crystalline polyolefins, alpha-polyolefins, reactor-ready polyolefins, acrylates, metallocene-catalyzed polyolefin polymers and elastomers, reactor-made thermoplastic polyolefin elastomers, olefin block copolymer, copolyester block copolymer, polyurethane block copolymer, polyamide block copolymer, thermoplastic polyolefins, thermoplastic vulcanizates, ethylene vinyl acetate copolymer, ethylene n-butyl acrylate copolymer, ethylene methyl acrylate copolymer, neoprene, acrylics, urethane, poly(acrylate), ethylene acrylic acid copolymer, polyether ether ketone, polyamide, atactic polypropylene, polyethylene including atactic polypropylene, ethylene-propylene polymers, propylene-hexene polymers, ethylene-butene polymers, ethylene octene polymers, propylene-butene polymers, propylene-octene polymers, metallocene-catalyzed polypropylene polymers, metallocene-catalyzed polyethylene polymers, ethylene-propylene-butylene terpolymers, copolymers produced from propylene, ethylene, $C_4$-$C_{10}$ alpha-olefin monomers, polypropylene polymers, maleated polyolefins, polyester copolymers, copolyester polymers, ethylene acrylic acid copolymer, and/or polyvinyl acetate, and/or wherein the polymer optionally comprises a modification and/or functionalization selected from one or more of hydroxyl-, ethoxy-, epoxy-, siloxane-, amine-, aminesiloxane-, carboxy-, phthalocyanine-, and silane-sulfide-groups, at the polymer chain ends or pendant positions within the polymer.

In particular embodiments, the elastomer includes a mixture of natural rubber (or synthetic polyisoprene), and a butadiene-based rubber, such as polybutadiene, halogenated butadiene, styrene-butadiene copolymer, or mixture thereof.

In some embodiments, unsaturated elastomers may be partially hydrogenated to reduce the degree of unsaturation.

The glass transition temperature (Tg) of an elastomer may be determined according to DIN 53445, "Torsion Pendulum Test, Testing of Polymer Materials" (1986), at a heating rate of 1° C. per minute, unless otherwise indicated.

Reinforcing Fillers

The composition may include at least one reinforcing filler. Example reinforcing fillers suitable for use in rubber compositions include various forms of carbon, such as carbon black, carbon nanotubes, and graphene; and inorganic oxides, such as silica (e.g., precipitated or fumed), aluminosilicates, aluminum hydroxide, clay (reinforcing grades), magnesium hydroxide, calcium carbonate, boron nitride, aluminum nitride, titanium dioxide, and reinforcing zinc oxide, other mineral oxide fillers, and mixtures thereof. Reinforcing fillers may be used in a total amount of at least 1 phr, or at least 5 phr, or at least 10 phr, or up to 250 phr, or up to 200 phr, or up to 160 phr, or up to 120 phr, or up to 80 phr.

In one embodiment, the reinforcing filler is selected from carbon black, silica, and mixtures thereof.

Carbon Black

The amount of carbon black, where used, may be at least 2 phr such as at least 5 phr, or at least 8 phr, or at least 10 phr, and/or up to 200 phr, or up to 80 phr, or up to 50 phr. In one embodiment, the total amount of silica and carbon black is at least 10 phr, or at least 30 phr, such as at least 45 phr or up to 130 phr. A ratio of carbon black to silica in the composition may range from 1:100 to 100:1, by weight, such as at least 10:90, or at least 20:80, or up to 90:10, or up to 80:20.

In one embodiment, the coupling agent may be pre-mixed with the carbon black prior to addition to a rubber composition.

The surface area of carbon black can be determined by various methods. In one embodiment, it is determined as the STSA specific surface area according to ASTM D6556-21, "Standard Test Method for Carbon Black—Total and External Surface Area by Nitrogen Adsorption" The carbon black may have a STSA specific surface area of at least 90, or at least 100, or up to 120, or up to 116 $m^2$/kg.

The Oil Absorption Number (OAN) of carbon black is determined according to ASTM D2414-22, "Standard Test Method for Carbon Black-Oil Absorption Number (OAN)." In this method, OAN is expressed as the number of cubic centimeters of dibutyl phthalate (or paraffin) absorbed by 100 g of carbon black, following Procedure A, using the standard reference grade defined by the ASTM D24 Committee for normalization. The OAN value is proportional to the degree of aggregation of structure level of the carbon black.

Carbon blacks are often assigned an ASTM designation which is indicative of the degree of structure, as specified by ASTM D1765-21, "Standard Classification System for Carbon Blacks Used in Rubber Products." Exemplary carbon blacks useful herein include ASTM designations N110, N121, N134, N220, N231, N234, N242, N293, N299, N315, N326, N330, N332, N339, N343, N347, N351, N358, N375, N539, N550, N582, N630, N642, N650, N683, N754, N762, N765, N774, N787, N907, N908, N990 and N991, as specified by ASTM D1765-21, "Standard Classification System for Carbon Blacks Used in Rubber Products." These carbon blacks may have an OAN number ranging from 34 to 150 $cm^3$/100 g.

Silica

The exemplary rubber composition may include silica to provide reinforcement to the rubber article. When used with carbon black, silica can minimize carbon black loading while lowering hysteresis and increasing tear resistance.

The rubber composition may include at least 2 phr, or at least 3 phr, or at least 5 phr, or at least 8 phr, or at least 10 phr, or at least 12 phr, or up to 160 phr, or up to 120 phr, or up to 80 phr, or up to 20 phr, or up to 15 phr, or up to 12 phr of silica. The silica may be at least 12 phf, or at least 16 phf, or at least 20 phf, or up to 100 phf, or up to 40 phf, or up to 30 phf, or up to 25 phf of the reinforcing fillers. In another embodiment, silica may be omitted from the rubber composition.

The silica may be amorphous (e.g., precipitated) silica and/or crystalline silica. The term "silica" is used herein to refer to silicon dioxide, $SiO_2$ (which may contain minor amounts of impurities, generally less than 1 wt. %, resulting from the process in which the silica is formed). The term "precipitated silica" is used to refer to synthetic amorphous silica, typically obtained by a process in which a silicate is precipitated with an acidifying agent.

The silica may be prepared by various methods. Precipitated silica may be prepared by digesting amorphous silica, e.g., found in rice husks or other biological wastes, with sodium hydroxide to form sodium silicate and precipitating silica from the sodium silicate by reaction with an acidifying agent, such as sulfuric acid or carbon dioxide. The resulting silica precipitate is washed and filtered. Methods for the preparation of precipitated silica are disclosed, for example, in U.S. Pat. Nos. 5,587,416 A, 5,800,608 A, 5,882,617 A, and 9,359,215 B2, and U.S. Pub. Nos. 20020081247 A1, and 20050032965 A1. Precipitated silica may also be formed from silica gel as described, for example, in U.S. Pat. Nos. 5,708,069, 7,550,610, and 5,789,514. Silica gels may be derived, for example, by hydrophobating a silica hydrogel with, for example, an organomercaptosilane and alkyl silane and drying the product.

The surface area of silica can be measured in various ways. One method is through nitrogen adsorption in accordance with ASTM D1993-18, "Standard Test Method for Precipitated Silica-Surface Area by Multipoint BET Nitrogen Adsorption," which is referred to herein as nitrogen surface area. Another method is in accordance ASTM D6845-20, "Standard Test Method for Silica, Precipitated, Hydrated-CTAB (Cetyltrimethylammonium Bromide) Surface Area," which is referred to herein as CTAB surface area. The CTAB molecule is relatively large, so it is not adsorbed in micropores or on surface roughness. Thus, the CTAB surface area reflects only the surface of the silica that is available for interaction with rubber molecules.

The exemplary silica may have a CTAB surface area of 110-350 $m^2/g$. In one embodiment, the silica has a high surface area, such as a CTAB surface area of at least 220 $m^2/g$, or at least 240 $m^2/g$, or at least 250 $m^2/g$, or up to 400 $m^2/g$, or up to 350 $m^2/g$, or up to 300 $m^2/g$. In another embodiment, the silica has a medium surface area, such as a CTAB surface area of 140-180 $m^2/g$.

The silica particles may have an average particle size (mean diameter) of 0.01 to 0.05 micron as determined by an electron microscope, although the silica particles may be even smaller, or larger, in size.

Examples of silicas useful herein include Hi-Sil™ 532, Hi-Sil™ 532 EP, and Hi-Sil™ EZ 160G from PPG Industries; Hubersil™ 4155 from the J. M. Huber Company; Zeosil™, under the designations 115GR, 125GR, 165GR, 175GR, 185GR, 195GR, 1085GR, 1165MP, 1115MP, HRS 1200MP, Premium MP, Premium 200MP, 195 HR, and Premium SW, from Solvay; Ultrasil™, under the designations VN2, VN3, VN3GR, 5000GR, 7000GR, 9000GR from Evonik; Zeopol™, under the designations 8755LS and 8745 from Evonik; Newsil™, under the designations 115GR and 2000MP, from Wuxi Quechen Silicon Chemical Co., Ltd; and Tokusil™ 315 from Maruo Calcium Co., Ltd.

The silica may have been surface treated, e.g., with the exemplary coupling agent, or with an organosilane, and/or a dispersing aid, prior to incorporating the pretreated silica into the rubber composition. Pretreatment can enhance dispersion and/or subsequent adherence to the elastomers. In another embodiment, the silica may be treated with the coupling agent and/or dispersing aid in situ, within the rubber composition, e.g., prior to or after addition of the curing agent.

The silica particles may be functionalized, e.g., with thiol groups, and/or have been pretreated with an organosilane.

The organosilane is generally one which increases the hydrophobic character of the silica particles, making it more dispersible in the elastomer(s). Examples of organosilanes include alkylsilanes, which may be halogenated, alkoxylated, and or/contain polysulfide groups. Example organosilanes are described, for example, in U.S. Pat. Nos. 4,474,908, 5,780,535, 5,780,538, 5,827,912, 6,005,027, 6,121,347, 6,136,913, 6,573,324, 6,608,145B1, 8,003,724, 8,440,750B2, 9,074,073, 10,947,369B2, and 11,440,877, and U.S. Pub. No. 20220204351. Such organosilanes may include a sequence of from one to eight sulfur atoms, the sequence being connected at each end to a carbon atom.

Examples of silica dispersing aids include glycols, such as fatty acids, diethylene glycols, alkylene glycols such as polyethylene glycols and polypropylene glycols, fatty acid esters of hydrogenated or non-hydrogenated $C_5$ or $C_6$ sugars, polyoxyethylene derivatives of fatty acid esters of hydrogenated or non-hydrogenated $C_5$ or $C_6$ sugars, and mixtures thereof. Exemplary fatty acids include stearic acid, palmitic acid, and oleic acid. Exemplary fatty acid esters of hydrogenated and non-hydrogenated $C_5$ and $C_6$ sugars (e.g., sorbose, mannose, and arabinose) include sorbitan oleates, such as sorbitan monooleate, dioleate, trioleate, and sesquioleate, and sorbitan esters of laurate, palmitate, and stearate fatty acids. Exemplary polyoxyethylene derivatives of fatty acid esters of hydrogenated and non-hydrogenated $C_5$ and $C_6$ sugars include polysorbates and polyoxyethylene sorbitan esters, which are analogous to the fatty acid esters of hydrogenated and non-hydrogenated sugars except that ethylene oxide groups are placed on each of the hydroxyl groups.

Exemplary polyalkylene oxides may have a weight average molecular weight $M_w$ of at least 500, such as at least 2,000, or at least 4,000, or up to 15,000, or up to 12,000, or up to 10,000, or up to 8,500. In cases where polyalkylene oxide, e.g., polyethylene glycol, is utilized in the rubber composition, it may be included in an amount of at least 0.1 phr, such as at least 0.2 phr, or at least 0.3 phr, or up to 5 phr, or up to 3 phr, or up to 2 phr, or up to 1 phr, or up to 0.6 phr.

Examples of commercially available polyethylene glycols include Carbowax™ PEG 3350 and Carbowax™ PEG 8000 from the Dow Chemical Company where the number indicates an approximate weight average molecular weight. Other polyalkylene oxide polymers may be used, as described, for example, in U.S. Pat. Nos. 6,322,811 and 4,082,703.

Silica dispersing aids, if used, may be present in a total amount of at least 0.1 wt. %, based on the weight of the silica, or at least 0.5 wt. %, or at least 1 wt. %, or up to 25 wt. %, or up to 20 wt. % or up to 15 wt. %.

Other Reinforcing Fillers

Additional reinforcing fillers, other than the silica and the carbon black, may be utilized, e.g., in total amounts of up to 60 phr, or up to 20 phr, or up to 10 phr, or up to 1 phr, or may be absent. Examples of such additional reinforcing fillers include calcium carbonate, alumina, aluminum hydroxide, clay (reinforcing grades), magnesium hydroxide, boron nitride, aluminum nitride, titanium dioxide, reinforcing zinc oxide, and combinations thereof.

Processing Aids

Processing aids may be used at a total of at least 4 phr, or up to 100 phr, and may include one or more of a) liquid plasticizers, b) resins, c) waxes, d) antioxidants, antidegradants, antiozonants, and materials which provide two or more of these functionalities.

The term liquid plasticizer is used to refer to plasticizer ingredients which are liquid at room temperature (i.e., liquid at 25° C. and above). Hydrocarbon resins, in contrast to plasticizers, are generally solid at room temperature. Generally, liquid plasticizers have a Tg that is below 0° C., generally well below 0° C., such as less than −30° C., or less than −40° C., or less than −50° C., such as a Tg of 0° C. to −100° C. The term "mineral oil" refers generally to oils produced by distillation of petroleum that are liquid at room temperature. The Tg of such mineral oils may be −40° C. to −100° C.

Suitable liquid plasticizers include oils (e.g., petroleum-based hydrocarbon oils as well as plant-sourced oils) and non-oil liquid plasticizers, such as ether plasticizers, ester plasticizers, phosphate plasticizers, and sulfonate plasticizers. Liquid plasticizer may be added during the compounding process or later, as an extender oil (which is used to extend a rubber). Petroleum based oils may include aromatic, naphthenic, low polycyclic aromatic (PCA) oils, and mixtures thereof. Plant oils may include oils harvested from vegetables, nuts, seeds, and mixtures thereof, such as triglycerides.

Suitable low PCA oils include those having a polycyclic aromatic content of less than 3 wt. % by weight as determined by the IP346 method (Standard Methods for Analysis & Testing of Petroleum and Related Products and British Standard 2000 Parts, 2003, 62nd edition, published by the Institute of Petroleum, UK). Exemplary petroleum sourced low PCA oils include mild extraction solvates (MES), treated distillate aromatic extracts (TDAE), Treated Residual Aromatic Extracted Solvents (TRAE), and heavy naphthenics. Exemplary MES oils are available commercially as CATENEX™ SNR from Shell, PROREX™ 15 and FLEXON™ 843 from ExxonMobil, and VIVATEC™ 200 from H&R Group. Exemplary TDAE oils are available as TYREX™ 20 from ExxonMobil, and VIVATEC™ 500 and VIVATEC™ 180 from H&R Group. Exemplary heavy naphthenic oils are available as SHELLFLEX™ 794 from Shell, and Hyprene™ Black Oil from Ergon. Exemplary plant-sourced oils include soy or soybean oil, sunflower oil (including high oleic sunflower oil), safflower oil, corn oil, linseed oil, cotton seed oil, rapeseed oil, cashew oil, sesame oil, camellia oil, jojoba oil, macadamia nut oil, coconut oil, and palm oil.

Exemplary ether plasticizers include polyethylene glycols, polypropylene glycols, and polybutylene glycols, including triesters and diesters of carboxylic acid, phosphoric acid, or sulphonic acid, and mixtures of these triesters. More specifically, exemplary carboxylic acid ester plasticizers include compounds selected from the group consisting of trimellitates, pyromellitates, phthalates, 1,2-cyclohexanedicarboxylates, adipates, azelates, sebacates, glycerol triesters, and mixtures thereof. Exemplary glycerol triesters include those which include at least 50 wt. % by weight, or at least 80 wt. % of an unsaturated C18 fatty acid (e.g., oleic acid, linoleic acid, linolenic acid, and mixtures thereof). Other exemplary carboxylic acid ester plasticizers include stearic acid esters, ricinoleic acid esters, phthalic acid esters (e.g., di-2-ethylhexyl phthalate and diisodecyl phthalate), isophthalic acid esters, tetrahydrophthalic acid esters, adipic acid esters (e.g., di(2-ethylhexyl) adipate and diisooctyl adipate), malic acid esters, sebacic acid esters (e.g., di(2-ethylhexyl) sebacate and diisooctyl sebacate), and fumaric acid esters. Exemplary phosphate plasticizers include those with a tri-hydrocarbyl phosphate or di-hydrocarbyl phosphate structure (where each hydrocarbyl is independently selected from $C_1$ to $C_{12}$ alkyl groups and substituted and un-substituted $C_6$ to $C_{12}$ aromatic groups. More specifically, exemplary phosphate plasticizers include trimethyl phosphate, triethyl phosphate, tributyl phosphate, trioctyl phosphate, dioctyl phosphate, 2-ethylhexyl diphenyl phosphate, tributoxyethyl phosphate, triphenyl phosphate, cresyl diphenyl phosphate, isodecyl diphenyl phosphate, tricresyl phosphate, tritolyl phosphate, trixylenyl phosphate, tris(chloroethyl) phosphate, and diphenyl mono-o-xenyl phosphate. Exemplary sulfonate plasticizers include sulfonic acid esters, such as sulfone butylamide, toluenesulfonamide, N-ethyl-toluenesulfonamide, and N-cyclohexyl-p-toluenesulfonamide.

The rubber composition may include at least 1 phr, or at least 2 phr, or up to 70 phr of liquid plasticizer, or up to 40 phr of liquid plasticizer. In other embodiments, liquid plasticizers are absent from the rubber composition.

Suitable resins include hydrocarbon resins. Example hydrocarbon resins include aromatic, aliphatic, and cycloaliphatic resins, including terpenes and terpenoids. The hydrocarbon resin may have a Tg of at least 0° C., or at least 30° C., or up to 125° C., or up to 50° C. Hydrocarbon resin Tg can be determined by DSC, according to the procedure discussed above for elastomer Tg measurements. The hydrocarbon resin may have a softening point of at least 70° C., or up to 100° C. The softening point of a hydrocarbon resin is generally related to the Tg. The Tg is generally lower than its softening point, and the lower the Tg the lower the softening point.

In one embodiment, the hydrocarbon resin, where used, is present in the rubber composition in a total amount of at least 1 phr, at least 2 phr, at least 3 phr, or at least 5 phr, or up to 70 phr, or up to 50 phr, or up to 40 phr, or up to 30 phr, or up to 20 phr, or up to 10 phr. In other embodiments, hydrocarbon resins are absent from the rubber composition.

Examples of aliphatic resins include C5 fraction homopolymer and copolymer resins. Examples of cycloaliphatic resins include cyclopentadiene ("CPD") homopolymer or copolymer resins, dicyclopentadiene ("DCPD") homopolymer or copolymer resins, and combinations thereof.

Examples of aromatic resins include aromatic homopolymer resins and aromatic copolymer resins. An aromatic copolymer resin refers to a hydrocarbon resin which comprises a combination of one or more aromatic monomers in combination with one or more other (non-aromatic) monomers, with the majority by weight of all monomers generally being aromatic.

Specific examples of aromatic resins include coumarone-indene resins, alkyl-phenol resins, and vinyl aromatic homopolymer or copolymer resins. Examples of alkyl-phenol resins include alkylphenol-acetylene resins such as p-tert-butylphenol-acetylene resins, alkylphenol-formaldehyde resins (such as those having a low degree of polymerization). Vinyl aromatic resins may include one or more of the following monomers: alpha-methylstyrene, styrene, ortho-methylstyrene, meta-methylstyrene, para-methylstyrene, vinyltoluene, para (tert-butyl) styrene, methoxystyrene, chlorostyrene, hydroxystyrene, vinylmesitylene, divinylbenzene, vinylnaphthalene and the like. Examples of vinylaromatic copolymer resins include vinylaromatic/terpene copolymer resins (e.g., limonene/styrene copolymer resins), vinylaromatic/C5 fraction resins (e.g., C5 fraction/styrene copolymer resin), vinylaromatic/aliphatic copolymer resins (e.g., CPD/styrene copolymer resin, and DCPD/styrene copolymer resin).

Other aromatic resins which may be used include terpene resins, such as alpha-pinene resins, beta-pinene resins, limonene resins (e.g., L-limonene, D-limonene, dipentene which is a racemic mixture of L- and D-isomers), beta-phellandrene, delta-3-carene, delta-2-carene, and combinations thereof.

In one embodiment, the hydrocarbon resin includes a combination of aromatic and aliphatic/cycloaliphatic hydrocarbons. In such cases, the total amount of any aliphatic and/or cycloaliphatic resin used in combination with the aromatic resin may be no more than 5 phr, or less than 4 phr, or less than 3 phr, or more than 20% by weight, or no more than 15% or no more than 10% by weight of the overall amount of hydrocarbon resins.

The aromatic resin may have a Mw of at least 1000 grams/mole and/or up to 4000 grams/mole.

Other example resins which may be used in the rubber composition include tackifying resins, such as unreactive phenol formaldehyde, and stiffness resins, such as reactive phenol formaldehyde resins and resorcinol or resorcinol and hexamethylene tetramine, which may be used at 1 to 10 phr, with a minimum tackifier resin, if used, being 1 phr and a minimum stiffener resin, if used, being 3 phr. Other resins include benzoxazine resins, as described in U.S. Pub. No. 20220195153 A1 to Papakonstantopoulos, et al.

A total amount of resin in the rubber composition may be at least 1 phr, or at least 5 phr, or up to 50 phr, or up to 20 phr, or up to 10 phr. In other embodiments, resins are absent from the rubber composition.

Suitable waxes, particularly microcrystalline waxes, may be of the type shown in The Vanderbilt Rubber Handbook (1978), pp. 346 and 347. Example waxes include $C_{22}$-$C_{60}$ saturated hydrocarbons, which may be branched or unbranched, and mixtures thereof. The wax(es), where used, may be present in the rubber composition at 1 to 5 phr. In other embodiments, waxes are absent from the rubber composition.

The waxes used may serve as antiozonants.

Exemplary antioxidants, other than the waxes, include amine based antioxidants, such as paraphenylenediamines (PPDs), e.g., diphenyl-p-phenylenediamine, N-(1,3-dimethylbutyl)-N'-phenyl-p-phenylenediamine (6PPD), diphenyl-p-phenylenediamine, and others, such as those disclosed in The Vanderbilt Rubber Handbook (1978), pages 344-346. Such antioxidants may also serve as antiozonants and may be used at from 0.1 to 5 phr, such as at least 0.3 phr, or at least 1 phr, or up to 3 phr. In other embodiments, antioxidants, such as paraphenylenediamines, are absent from the rubber composition.

Antidegradants, where used, may include amine based antidegradants and phenol-containing antidegradants, and may be used at from 1 to 5 phr. In other embodiments, antidegradants are absent from the rubber composition.

Phenol-containing antidegradants include polymeric hindered phenol antioxidants, and others, such as those included in The Vanderbilt Rubber Handbook (1978), pages 344-347.

Vulcanization Aids

The vulcanization/curing is conducted in the presence of a sulfur-based vulcanizing agent. Examples of suitable sulfur vulcanizing agents include elemental sulfur (free sulfur) and sulfur donating vulcanizing agents, for example, an amine disulfide, polymeric polysulfide, or sulfur olefin adduct. Sulfur vulcanizing agents, when used, may be present in the rubber composition in an amount ranging from about 0.5 to about 10 phr.

Cure accelerators and activators act as catalysts for the vulcanization agent. Accelerators are used to control the time and/or temperature required for vulcanization and to improve the properties of the vulcanizate. In one embodiment, a single accelerator system may be used, i.e., primary accelerator. A primary accelerator may be used in amounts ranging from 0.5 to 5 phr. In another embodiment, combinations of two or more accelerators may be used. In this embodiment, a primary accelerator is generally used in the larger amount (0.5 to 4 phr), and a secondary accelerator is generally used in smaller amounts (0.05 to 1 phr), in order to activate and to improve the properties of the vulcanizate. Combinations of such accelerators have historically been known to produce a synergistic effect of the final properties of sulfur-cured rubbers and are often somewhat better than those produced by use of either accelerator alone. In addition, delayed action accelerators may be used which are less affected by normal processing temperatures but produce satisfactory cures at ordinary vulcanization temperatures.

Representative examples of cure accelerators include amines, disulfides, guanidines, thioureas, thiazoles, thiurams, sulfenamides, dithiocarbamates and xanthates. In one embodiment, the primary accelerator is a sulfenamide. If a second accelerator is used, the secondary accelerator may be a guanidine, dithiocarbamate or thiuram compound, although a second sulfenamide accelerator may be used.

Examples of such cure accelerators include thiazole and/or sulfenamide vulcanization accelerators, such as 2-mercaptobenzothiazole, 2,2'-dithiobis(benzothiazole) (MBTS), N-cyclohexyl-2-benzothiazole-sulfenamide (CBS), and N-tert-butyl-2-benzothiazole-sulfenamide (TBBS), guanidine vulcanization accelerators, such as diphenyl guanidine (DPG), and mixtures thereof. In tread compositions, thiuram accelerators may be omitted.

The total amount of the vulcanization accelerator may be from 0.1 to 10 phr, e.g., at least 0.5 phr, or at least 1 phr, or up to 5 phr. In other embodiments, vulcanization accelerators are absent from the rubber composition.

Vulcanizing activators are additives used to support vulcanization. Generally, vulcanizing activators include both an inorganic and organic component. Zinc oxide is the most widely used inorganic vulcanization activator. Organic vulcanization activators include stearic acid, palmitic acid, lauric acid, zinc salts of each of the foregoing, and thiourea compounds, e.g., thiourea, and dihydrocarbylthioureas such as dialkylthioureas and diarylthioureas, and mixtures thereof. Specific thiourea compounds include N,N'-diphenylthiourea, trimethylthiourea, N,N'-diethylthiourea (DEU), N,N'-dimethylthiourea, N,N'-dibutylthiourea, ethylenethiourea, N,N'-diisopropylthiourea, N,N'-dicyclohexylthiourea, 1,3-di(o-tolyl)thiourea, 1,3-di(p-tolyl)thiourea, 1,1-diphenyl-2-thiourea, 2,5-dithiobiurea, guanylthiourea, 1-(1-naphthyl)-2-thiourea, 1-phenyl-2-thiourea, p-tolylthiourea, and o-tolylthiourea.

The amount of inorganic vulcanization activator may be from 0.1 to 12 phr, or at least 0.5 phr, or at least 1 phr, or up to 8 phr. The amount of organic vulcanization activator may be from 0.1 to 10 phr, or at least 0.5 phr, or at least 1 phr, or at least 4 phr, or up to 8 phr. In other embodiments, one or both of inorganic and organic vulcanization activators are absent from the rubber composition.

Free radical initiators, which may be used in some embodiments, are sometimes known as redox initiators, and include combinations of chelated iron salts, sodium formaldehyde sulfoxylate, and organic hydroperoxides. Representative organic hydroperoxides include cumene hydroperoxide, paramenthane hydroperoxide, and tertiary butyl hydroperoxide. The free radical initiator may be used in combination with, or as an alternative to, a sulfur-based vulcanizing agent. The amount of free radical initiator, where used, may be 0.1 to 4 phr, or 0.5 to 2 phr. In other embodiments, free radical initiators are absent from the rubber composition.

Vulcanization inhibitors are used to control the vulcanization process and generally retard or inhibit vulcanization until the desired time and/or temperature is reached. Example vulcanization inhibitors include cyclohexylthiophthalimide.

The amount of vulcanization inhibitor, where used, may be 0.1 to 3 phr, or 0.5 to 2 phr. In other embodiments, vulcanization inhibitors are absent from the rubber composition.

Example rubber compositions are shown in Table 1.

TABLE 1

Example Rubber Compositions

| Component | Example A | Example B |
|---|---|---|
| Elastomer, including any unsaturated elastomer | 100 phr | 100 phr |
| Coupling agent | 0.1-10 | 0.1-10 |
| Silica | 4-250 phr | 10-150 phr |
| Carbon black | 2-200 phr | 5-80 phr |
| Processing aids (e.g., liquid plasticizer, resin, wax, anti-oxidants, antidegradants, antiozonants) | 4-100 phr | 10-50 phr |
| Cure Package (e.g., sulfur-based vulcanizing agent, cure accelerator, cure activator, e.g., zinc oxide and fatty acid(s)) | 1-30 phr | 5-20 phr |

Forming a Rubber Composition

To form a cured rubber composition, one or more non-productive mixing stages is/are followed by a productive mixing stage, and finally a vulcanization stage, in which the rubber composition is cured, e.g., to form a shaped product, such as a tire tread, tire innerliner, or reinforced plies.

The non-productive stages are intended to mix the elastomer(s) and other rubber forming additives (as exemplified above, but excluding at least the vulcanizing agent and optionally any accelerator(s) and/or activator(s)). In particular, the reinforcing filler(s) are mixed with the elastomer(s), to blend them thoroughly. The non-productive stages may be performed at a suitable temperature of 140-200° C., with the mixture being allowed to cool between each of the non-productive stages. The number of non-productive stages may depend on the amount of filler(s) to be incorporated, with higher filler amounts generally involving a greater number of non-productive stages, e.g., up to three, or in some cases, four or more. The coupling agent may be incorporated into the mixture in one of the non-productive stages, such as the last.

In the productive mixing step, i.e., when the vulcanization agent is added, the temperature is generally maintained at a temperature below that at which curing occurs to any substantial degree, e.g., no more than 120° C., such as 40° C. to 120° C., or 60° C. to 110° C.

The mixture may be extruded, milled, molded, and/or calendered or otherwise shaped to form a green (i.e., uncured or incompletely cured) component having the approximate shape of the desired article or part thereof. The parts used to make up a tire can be built up sequentially, e.g., in a mold or on a core, from a number of green components.

The shaped rubber composition may then be cured at a temperature at which vulcanization occurs, e.g., at temperatures ranging from 100° C. to 200° C., or from 110° C. to 180° C. Any of the usual vulcanization processes may be used, such as heating in a press or mold or on a core, or heating with superheated steam or hot air. For example, tires can be built, shaped, molded and cured by various methods which are known and will be readily apparent to those having skill in such art.

The exemplary coupling agent can be incorporated before the first non-productive mixing stage, during one or more of the non-productive mixing stages, during the productive mixing stage, during the vulcanization stage, or in more than one of these stages. In one embodiment, the coupling agent may be combined separately with the mineral filler, carbon black, and/or unsaturated polymer prior to being mixed with other rubber forming additives. In another embodiment, the coupling agent is added to the mixer with the filler, unsaturated polymer, and one or more rubber forming additives in one or more of the non-productive mixing stages. In another embodiment, the coupling agent is added to the mixer after the non-productive mixing stage(s), such as in the productive mixing stage.

Without intending to limit the scope of the exemplary embodiments, the following examples illustrate preparation of the coupling agent.

EXAMPLES

Example 1: Preparation of Bis [2-((3,4-Dihydroxybenzal))imine)ethyl]disulfide [BDHBIEDS]

Cystamine dihydrochloride (22.5.0 g, 100.0 mmol; MW=225.2; CAS #: 56-17-7) and water (80 ml) are placed in a flask fitted with a magnetic stirrer. Potassium hydroxide (11.2 g, 2×100 mmol, MW=56.11; CAS #: 1310-58-3) is added and the contents of the flask are stirred at 0° C. for 30 min. A solution of 3,4-dihydroxybenzaldehyde (2×13.8 g, 2×100 mmol; MW=138.12; CAS #: 139-85-5) in ethanol (200 ml) is slowly added to the flask. The mixture is stirred at room temperature for 24 hours. The precipitate formed is filtered and washed with water (3×20 ml) and ethanol (3×20 ml), respectively. The product is vacuum dried at 80° C. for 8 hours. 33.9 g of a yellow colored solid product (86.4% of theoretical yield) is obtained. NMR spectroscopy, H_NMR (DMSO-$d_6$): 3.10 ppm (t, J=6.4 Hz, 4H), 3.86 ppm (t, J=6.4 Hz, 4H), 6.87 ppm (d, J=8.2 Hz, 2H), 7.24 ppm (d, J=9.8 Hz, 2H), 7.38 ppm (s, 2H), 8.40 ppm (s, 2H), 9.59 ppm (2H), 10.98 ppm (2H). mp=207.8° C.

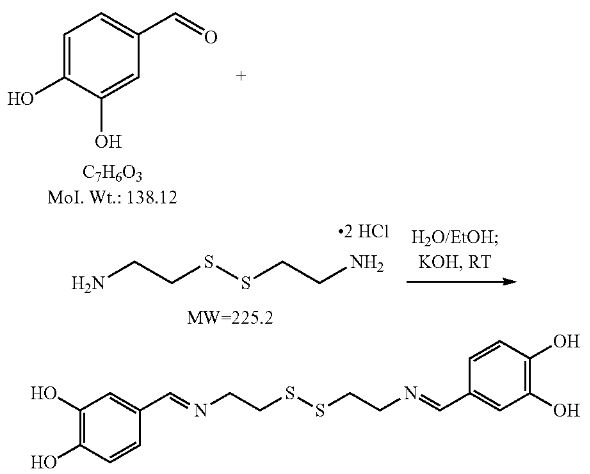

BDHBIEDS
$C_{18}H_{20}N_2O_4S_2$
Mol. Wt.: 392.49

Example 2: Preparation of Bis [2-((4-Hydroxybenzal))imine)ethyl]disulfide [BHBIEDS]

Bis [2-((4-hydroxybenzal)imine)ethyl]disulfide is prepared as for Example 1, but using 4-hydroxybenzaldehyde (CAS #: 123-08-0). A white colored solid product is obtained with a yield of 85.2%. H_NMR (DMSO-$d_6$): 2.99 ppm (t, J=6.6 Hz, 54H), 3.75 ppm (t, J=6.4 Hz, 4H), 6.78 ppm (m, 4H), 7.54 ppm (m, 4H), 8.18 ppm (s, 2H), 9.73 ppm (2H). mp=191.3°.

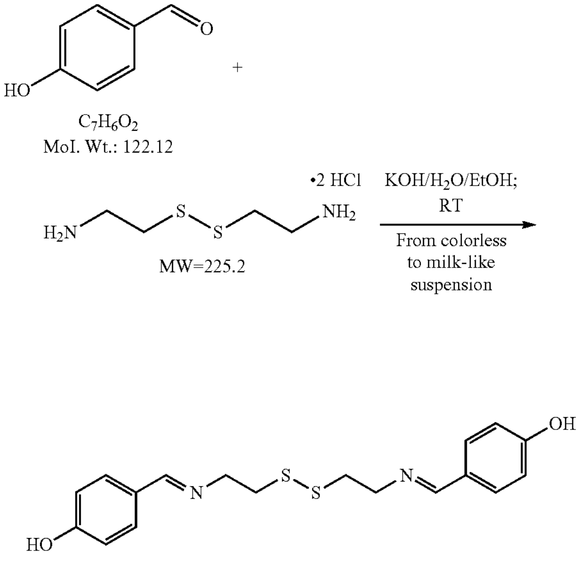

BDHBIEDS $C_{18}H_{20}N_2O_2S_2$

Mol. Wt.: 360.49

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A coupling agent according to Formula I, which is capable of linking at least one of a mineral oxide, carbon black and brass to an unsaturated elastomer, Formula I $$FG1—LG1—S_a—LG2—FG2$$

where FG1 and FG2 each represent a functionalized arylene group, which can be the same or different;

LG1 and LG2 each represent a linking group, which can be the same or different; and $S_a$ represents a sequence of two or more connected sulfur atoms, where a is a number which is at least 2;

wherein at least one of the functionalized arylene groups FG1 and FG2 includes at least one reactive substituent selected from hydroxyl groups (—OH), primary or secondary amino groups (—NH2, —NHR), sulfhydryl groups (—SH), boronic acid groups [—B(OH)2], and mixtures thereof, wherein in the case of —NHR, each R is a hydrocarbyl group; and wherein at least one of the functionalized arylene groups FG1 and FG2 has the general form shown in Formula II:

Formula II

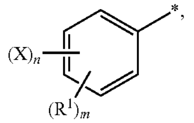

wherein each X is independently selected from —OH, —NH2, —NHR, —B(OH)2, and —SH, wherein in the case of —NHR, each R is a hydrocarbyl group; n is 1 or 2; each $R^1$ is independently a hydrocarbyl group or where two $R^1$ groups together form a ring; m is 0; and "*" represents a connection to a respective one of the linking groups.

2. The coupling agent of claim 1, wherein each X is OH.

3. The coupling agent of claim 1, wherein LG1 is of the general form:

$$—CH═N—(CH(COOH))_q—(CR^2R^3)_p—CH_2—,$$

where each p is 0, or at least 1, or at least 2, and/or up to 10, or up to 5;

each q is 0, or at least 1;

p+q≥1; and each of $R^2$ and $R^3$ is independently H, a hydrocarbyl group, or an oxygen-containing group.

4. The coupling agent of claim 1, wherein:

LG1 is of the general form: —CH═N—$CH_2$—$CH_2$—, and LG2 is its inverse, or

LG1 is —CH═N—CH(COOH)—($CH_2$)—, and LG2 is its inverse.

5. The coupling agent of claim 1, wherein the coupling agent is selected from the group consisting of:

Formula E

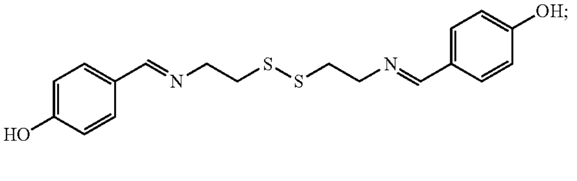
;

-continued

Formula F

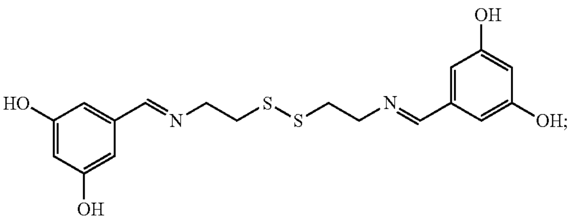

Formula G

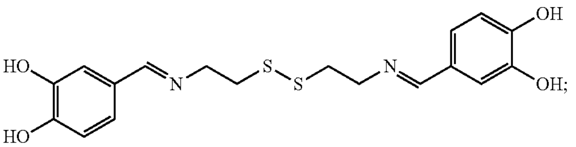

Formula H

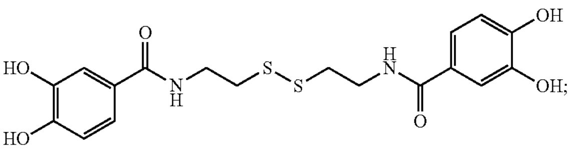

Formula I

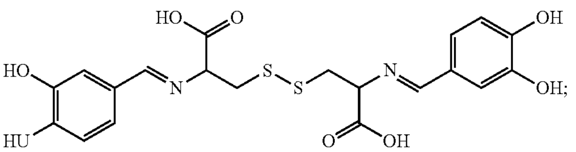

Formula J

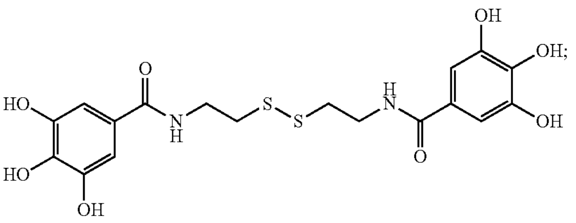

Formula K

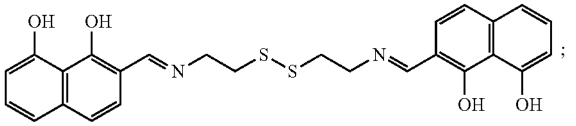

Formula L

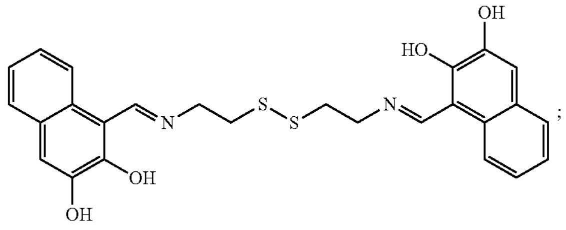

Formula M

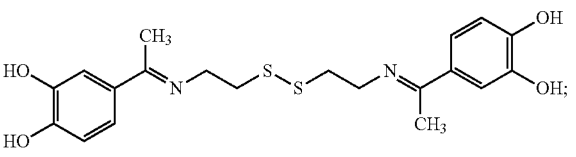

-continued

Formula N

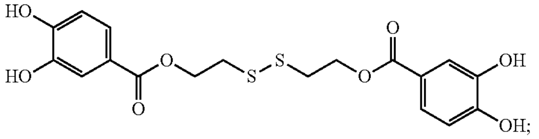

and

Formula O

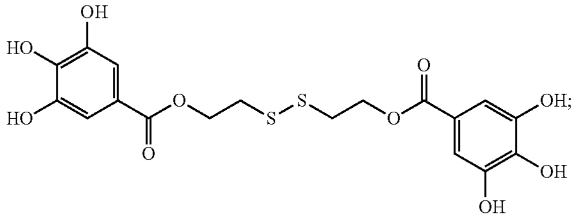

and amino-substituted, boronic acid substituted, and/or sulfhydryl substituted equivalents thereof.

6. A mixture or reaction product of the coupling agent of claim 1 and silica.

7. A rubber composition comprising, or being the reaction product of:

an unsaturated elastomer;

the coupling agent of claim 1;

at least one filler selected from a mineral oxide filler and carbon black; and a sulfur-based curing agent.

8. The rubber composition of claim 7, wherein the mineral oxide filler comprises silica.

9. An article formed from the rubber composition of claim 7.

10. The article of claim 9, wherein the article comprises a pneumatic tire or a portion thereof.

11. A method of forming a tire comprising:

combining a coupling agent with an unsaturated elastomer, at least one filler selected from a mineral oxide filler and carbon black, and a sulfur-based curing agent to form a mixture, the coupling agent formed by the reaction of:

a difunctional organic polysulfide having a first reactive group at a first end and a second reactive group at a second end; and a polyfunctional arylene compound which has a first functional group that is capable of reaction with the reactive groups of the difunctional organic polysulfide and a second functional group that is capable of interaction with a substrate surface, the polyfunctional arylene compound being in sufficient amount to react with the first and second reactive groups of the difunctional organic polysulfide;

shaping the mixture to form a green component of a tire; and curing the green component with other green components to form the tire.

12. The method of claim 11, wherein the difunctional organic polysulfide is selected from L-cystine, cystamine, and 2-hydroxyethyl disulfide.

13. The method of claim 11, wherein the first functional group is selected from an aldehyde group, a carboxylic acid group, an ether group, and an ester group.

14. The method of claim 11, wherein the second functional group is selected from the group consisting of a hydroxyl group, an amino group, a thiol group, and combinations thereof.

15. The method of claim 11, wherein the polyfunctional arylene compound has the general formula:
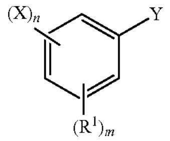
where Y represents the first functional group;
X represents the second functional group;
n is at least 1;
each $R^1$ is independently a hydrocarbyl group or where two $R^1$ groups together form a ring; and
m is 0, or at least 1.
* * * * *